US009542365B1

United States Patent
Rothman et al.

(10) Patent No.: US 9,542,365 B1
(45) Date of Patent: *Jan. 10, 2017

(54) METHODS FOR GENERATING E-MAIL MESSAGE INTERFACES (71) Applicant: Google Inc., Mountain View, CA (US)

(72) Inventors: Aaron Nathaniel Rothman, Sunnyvale, CA (US); Deepak Jindal, Los Altos, CA (US); David Farber Stern, San Francisco, CA (US); Jason Cornwell, San Francisco, CA (US); Stacey Kapadia, Menlo Park, CA (US); Nilesh Singh, San Jose, CA (US); Katharina Probst, Seattle, WA (US); Brendan Linn, San Francisco, CA (US); Isaac Sterling VanDuyn, Brooklyn, NY (US); Mayank Singhal, Mountain View, CA (US)

(73) Assignee: Google Inc., Mountain View, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 14/557,234

(22) Filed: Dec. 1, 2014

Related U.S. Application Data (63) Continuation of application No. 14/015,190, filed on Aug. 30, 2013, now Pat. No. 8,903,931.

(51) Int. Cl.
G06F 15/16 (2006.01)
H04L 12/58 (2006.01)
G06F 17/21 (2006.01)

(52) U.S. Cl.
CPC ......... *G06F 17/212* (2013.01); *H04L 51/063* (2013.01)

(58) Field of Classification Search
CPC .......... H04L 51/04; H04L 51/22; H04L 12/58; H04L 12/584; H04N 5/272; G06Q 10/107; G06F 17/212
USPC ................. 709/206; 705/14.35, 14.36, 14.73
See application file for complete search history.

(56) References Cited

U.S. PATENT DOCUMENTS

| | | | |
|---|---|---|---|
| 6,993,560 B2 * | 1/2006 | Takenaga | G06Q 10/107 345/619 |
| 8,384,942 B1 | 2/2013 | Shmunis et al. | |
| 8,903,931 B1 | 12/2014 | Rothman et al. | |
| 2006/0170705 A1 | 8/2006 | Wilson | |
| 2007/0038718 A1 * | 2/2007 | Khoo | G06Q 10/107 709/206 |

(Continued)

OTHER PUBLICATIONS

Gizmodo.com, "AOL's New Alto Email Client Makes your Inbox Look Pretty," Oct. 8, 2012, 3pp., downloaded from internet address http://gizmodo.com/5952782/aols-new-alto-email-client-makes-your-inbox-pretty, Jun. 10, 2013.

*Primary Examiner* — Alina N Boutah
(74) *Attorney, Agent, or Firm* — Foley & Lardner LLP; John D. Lanza (57) ABSTRACT

A method includes accessing, by a server computer, a plurality of electronic mail messages; identifying, based on information contained in each electronic mail message, one or more actions that can be taken with respect to each electronic mail message; and outputting, for display at a client computing device, an electronic mail interface. The electronic mail interface includes a message preview element for each electronic mail message. Each message preview element includes an interface element for causing performance of the action for each electronic mail message.

15 Claims, 8 Drawing Sheets

(56) References Cited

U.S. PATENT DOCUMENTS

| | | | |
|---|---|---|---|
| 2007/0083602 A1* | 4/2007 | Heggenhougen | H04L 12/583 709/206 |
| 2008/0005247 A9* | 1/2008 | Khoo | G06F 3/0482 709/206 |
| 2009/0214034 A1* | 8/2009 | Mehrotra | H04L 51/063 380/255 |
| 2009/0235196 A1* | 9/2009 | MacBeth | G06Q 10/107 715/780 |
| 2010/0049806 A1* | 2/2010 | Haynes | G06Q 10/107 709/206 |
| 2010/0077050 A1* | 3/2010 | MacBeth | G06Q 10/107 709/206 |
| 2010/0095237 A1* | 4/2010 | Turakhia | G06Q 30/02 715/781 |
| 2010/0131523 A1 | 5/2010 | Yu et al. | |
| 2011/0066692 A1 | 3/2011 | Ciancio-Bunch et al. | |
| 2011/0154194 A1* | 6/2011 | Mathai | G06F 9/4443 715/273 |
| 2011/0191163 A1* | 8/2011 | Allaire | G06Q 30/0239 705/14.39 |
| 2011/0270710 A1* | 11/2011 | Nash | G06Q 10/107 705/27.1 |
| 2011/0302258 A1 | 12/2011 | Huynh et al. | |
| 2012/0023416 A1* | 1/2012 | Khoo | G06F 3/0482 715/752 |
| 2012/0042025 A1* | 2/2012 | Jamison | G06Q 10/107 709/206 |
| 2012/0204095 A1* | 8/2012 | Gao | G06F 17/24 715/234 |
| 2012/0253916 A1 | 10/2012 | Ayloo | |
| 2013/0067353 A1 | 3/2013 | Canfield et al. | |
| 2013/0159082 A1* | 6/2013 | Abbott | G06Q 10/107 705/14.25 |
| 2013/0159432 A1* | 6/2013 | Deering | H04L 12/581 709/206 |
| 2013/0204946 A1* | 8/2013 | Forstall | G06Q 10/107 709/206 |
| 2013/0254314 A1* | 9/2013 | Chow | H04L 67/06 709/206 |
| 2013/0254317 A1* | 9/2013 | Altberg | G06Q 20/102 709/206 |
| 2013/0290079 A1* | 10/2013 | Chavan | G06Q 30/0251 705/14.4 |
| 2014/0040770 A1 | 2/2014 | Khoo | |

* cited by examiner

METHODS FOR GENERATING E-MAIL MESSAGE INTERFACES

CROSS-REFERENCE TO RELATED APPLICATION

This application is a continuation of U.S. application Ser. No. 14/015,190, filed on Aug. 30, 2013, the disclosure of which is hereby incorporated by reference in its entirety.

BACKGROUND

The disclosure herein relates generally to electronic mail (e-mail) services that cause an interface representing a list of e-mail messages to be output for display at a client computing device.

Users of e-mail services sometimes receive a large quantity of electronic mail messages. In a typical electronic mail service, a mailbox interface showing a list of messages is displayed, and the user can read each message by selecting the message from the list, which causes the message to be displayed, such as by displaying the message in a preview area, displaying the message in a new window, or by changing the view in a current window from a mailbox view to a message view.

In these systems, the user's ability to assess the content of the message is limited. For example, a typical mailbox interface may display the name of the sender, the subject line of the message, the time at which the message was received, and the first few words from the body of the message. Thus, to assess the contents of the message and to take actions with respect to the message, users are typically required to open the message, such as by changing the current view to an interface that displays a copy of the message, or by opening a new window in which the message is displayed.

SUMMARY

The disclosure relates to generating e-mail message interfaces.

One aspect of the disclosed embodiments is a method that includes accessing, by a server computer, a plurality of electronic mail messages; identifying, based on information contained in each electronic mail message, one or more actions that can be taken with respect to each electronic mail message; and outputting, for display at a client computing device, an electronic mail interface. The electronic mail interface includes a message preview element for each electronic mail message. Each message preview element includes an interface element for causing performance of the action for each electronic mail message.

Another aspect of the disclosed embodiments is a method that includes accessing, by a server computer, a plurality of electronic mail messages; extracting, from each electronic mail message, a graphical content element; extracting, from each electronic mail message, a textual content element; and outputting, for display at a client computing device, an electronic mail interface that includes a message preview element for each electronic mail message. Each message preview element includes the graphical content element from the respective electronic mail message, the textual content element from the respective electronic mail message, and an interface element for causing display of a menu. The menu includes at least one message action button for causing execution of an action with respect to the respective electronic mail message.

Another aspect of the disclosed embodiments is a method that includes accessing, by a server computer, a plurality of electronic mail messages; identifying a sender for each electronic mail message; accessing additional information related to the sender for each electronic mail message; and outputting, for display at a client computing device, an electronic mail interface that includes a message preview element for each electronic mail message. Each message preview element incorporates content from the respective electronic mail message and the additional information related to the sender of the respective electronic mail message.

Another aspect of the disclosed embodiments is a method that includes accessing, by a server computer, a plurality of electronic mail messages; extracting, from each electronic mail message, a graphical content element; extracting, from each electronic mail message, a textual content element; identifying a sender for each electronic mail message; accessing additional information related to the sender for each electronic mail message; and outputting, for display at a client computing device, an electronic mail interface that includes a message preview element for each electronic mail message. Each message preview element is based on a template having a graphical content portion for presenting the graphical content element from the respective electronic mail message, a textual content portion for presenting the textual content element from the respective electronic mail message, and an interface element for causing display of the additional information related to the sender of the electronic mail message.

BRIEF DESCRIPTION OF THE DRAWINGS

The description herein makes reference to the accompanying drawings wherein like reference numerals refer to like parts throughout the several views, and wherein.

DETAILED DESCRIPTION

Methods for generating e-mail message interfaces are disclosed herein. Because recipients of e-mail messages often receive a large number of e-mail messages, many of those messages are not opened or read by the recipient. In particular, it is often the case that promotional e-mails sent to users by advertisers are not opened by users. The systems and methods disclosed herein allow the provider of an e-mail application, such as a web-based e-mail application, to generate e-mail message interfaces that allow users to more easily understand the contents of the messages and to take action with respect to one or more of the messages represented in the e-mail message interface without the need for opening the message in a new interface, in a preview window, or in the current interface by navigating away from the e-mail message interface to interface display in a single e-mail message. The systems and methods disclosed herein also allow the provider of an e-mail application, such as a web-based e-mail application, to display additional information that is relevant to the e-mail messages in conjunction with the e-mail message interface.

Figure 1:
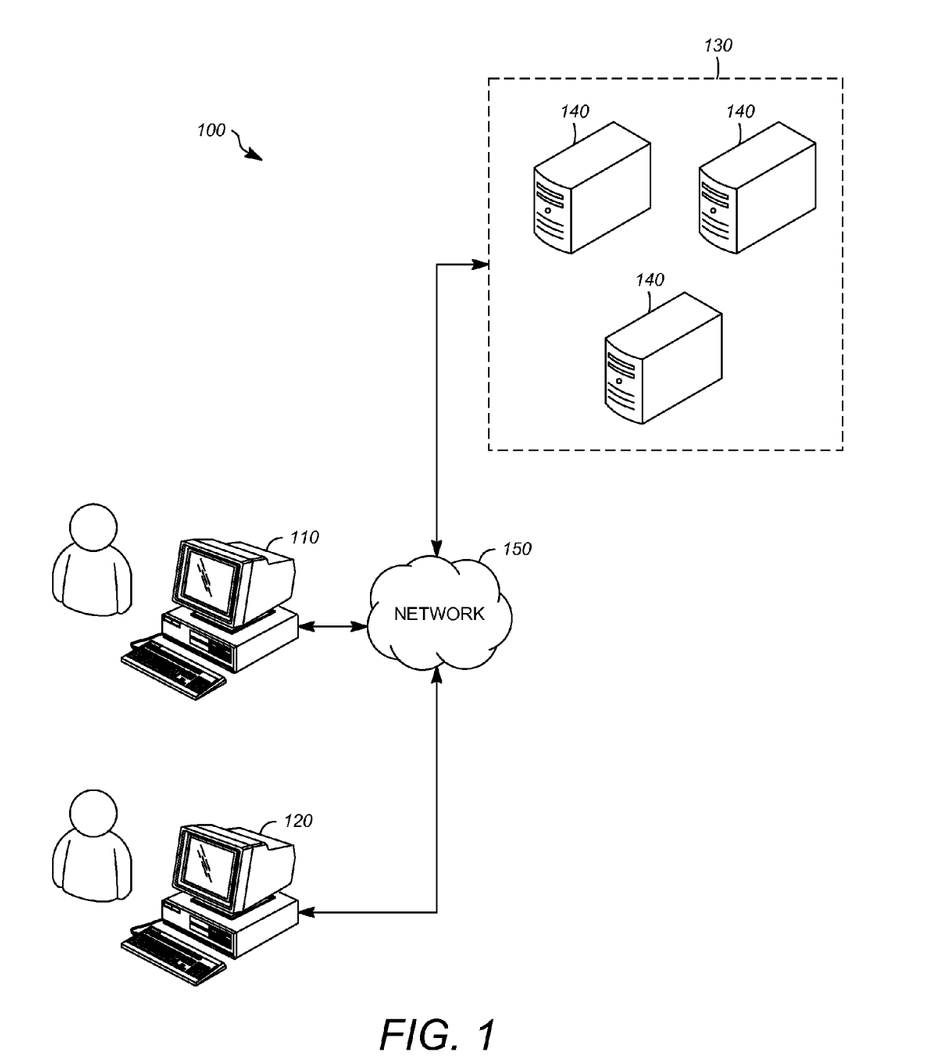
FIG. 1 is a block diagram showing an example of a system for generating e-mail interfaces.

FIG. 1 shows an example of an environment 100 in which a system for generating e-mail message interfaces can be implemented. The environment 100 can include a user system 110, a sender system 120, and an e-mail service 130. The user system 110 and the sender system 120 are each representative of a large number (e.g., millions) of user systems and sender systems that can be included in the environment 100. The user system 110 and the sender systems 120 can each be any manner of computer or computing device, such as a desktop computer, a laptop computer, a tablet computer, or a smart-phone (a computationally-enabled mobile telephone). The e-mail service 130 can be implemented using one or more server computers 140. The user system 110, the sender systems 120, and the e-mail service 130 can each be implemented as a single system, multiple systems, distributed systems, or in any other form.

The systems, services, servers, and other computing devices described herein are in communication via a network 150. The network 150 can be one or more communications networks of any suitable type in any combination, including wireless networks, wired networks, local area networks, wide area networks, cellular data networks, and the internet.

The e-mail service 130 provides an e-mail service to the user system 110. The description herein will be made with respect to a web-based e-mail service in that provides a web-browser-based interface for viewing mailboxes and e-mail messages. It should be understood, however, that the e-mail service can be provided in many other forms, such as in the form of an "app" that is executed by a tablet computer or a smart-phone, or in the form of desktop software that is executed by a personal computer.

Figure 2:
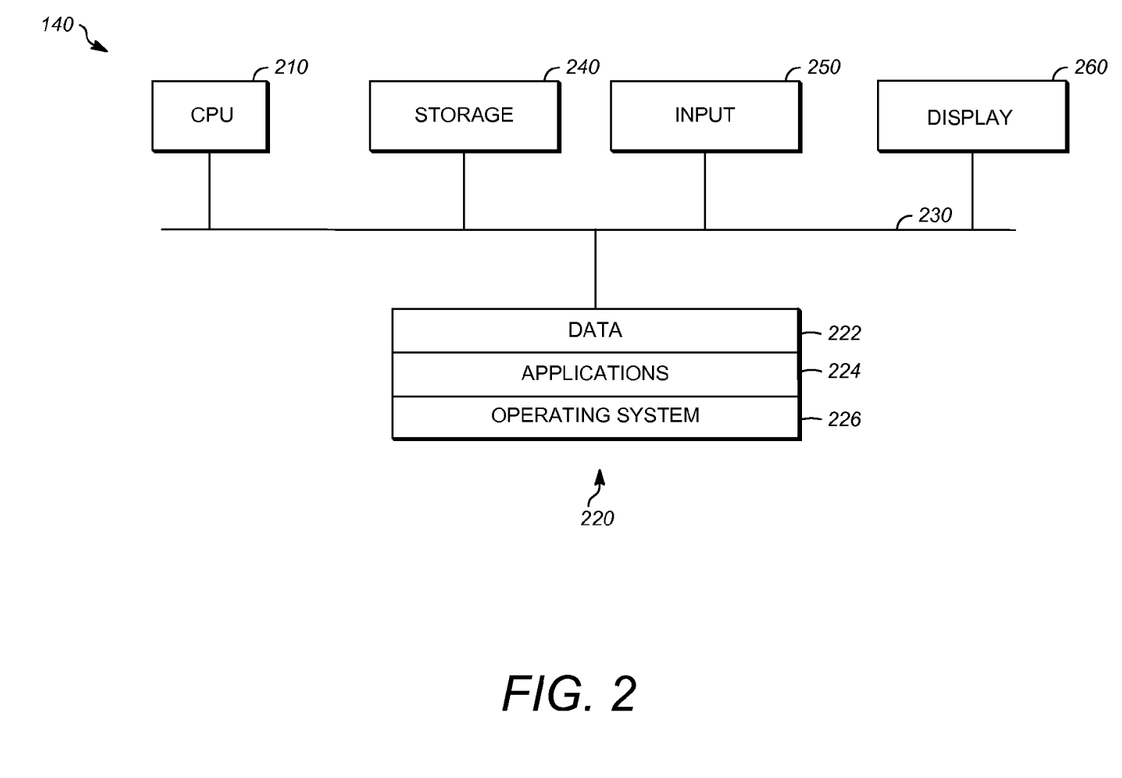
FIG. 2 is a block diagram showing an example of a hardware configuration for a server computer.

FIG. 2 is a block diagram of an example of a hardware configuration for the one or more server computers 140. The same hardware configuration or a similar hardware configuration can be used to implement the user system 110 and the sender systems 120. Each server computer 140 can include a CPU 210. The CPU 210 can be conventional central processing units. Alternatively, the CPU 210 can be any other type of device, or multiple devices, capable of manipulating or processing information now-existing or hereafter developed. Although the disclosed examples can be practiced with a single processor as shown, e.g., CPU 210, advantages in speed and efficiency can be achieved using more than one processor.

Each server computer 140 can include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of each server computer 140 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of each of each server computer 140 can be composed of multiple buses. Further, the storage device 240 can be directly coupled to the other components of the respective one of the server computers 140 or can be accessed via a network and can comprise a single integrated unit such as a memory card or multiple units such as multiple memory cards. The one or more server computers can thus be implemented in a wide variety of configurations.

Figure 3:
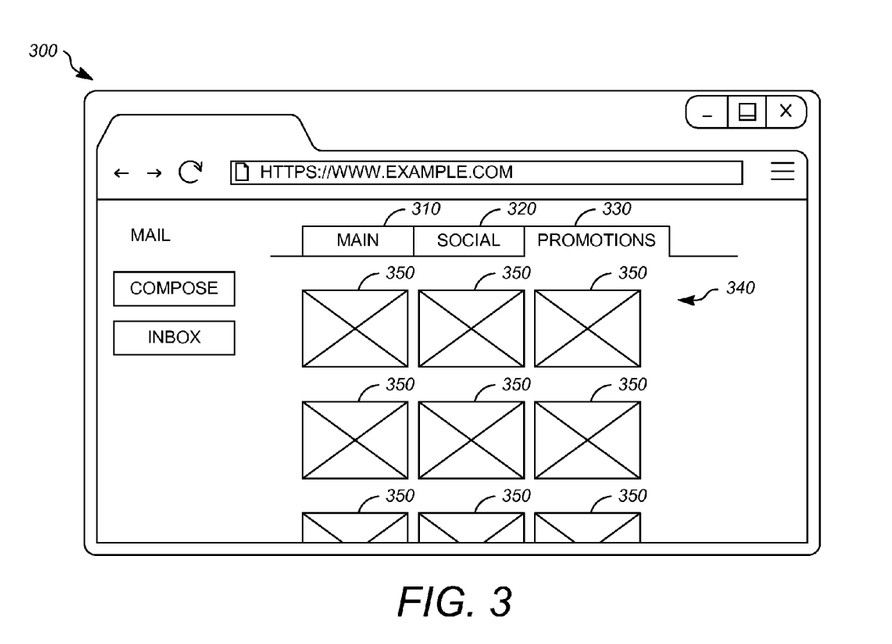
FIG. 3 is an illustration showing an example of an electronic mail interface screen having a plurality of message preview elements.

FIG. 3 shows an example of an e-mail interface screen 300. The e-mail interface screen 300 is displayed in the context of a web browser and can be, for example, a webpage encoded in a markup language such as HTML that is transmitted from the e-mail service 130 to the user system 110 and output for display at the user system 110.

The e-mail interface screen 300 includes a tabbed interface that groups e-mail messages by type. For example, the e-mail interface screen 300 includes a main tab 310, a social tab 320, and a promotions tab 330. In the illustrated example, a message index area 340 including a plurality of message preview elements 350 is displayed within the context of the promotions tab 330. It should be understood, however, that the systems and methods described herein can be applied to other types of e-mail message interfaces and are not limited to use with tabbed e-mail message interfaces.

In the message index area 340 of the e-mail interface screen 300, the message preview elements 350 are arranged in a rectangular array. In this example, each message preview elements 350 is rectangular, and the message preview elements can be square. It should be understood, however, that other configurations can be utilized.

Figure 4:
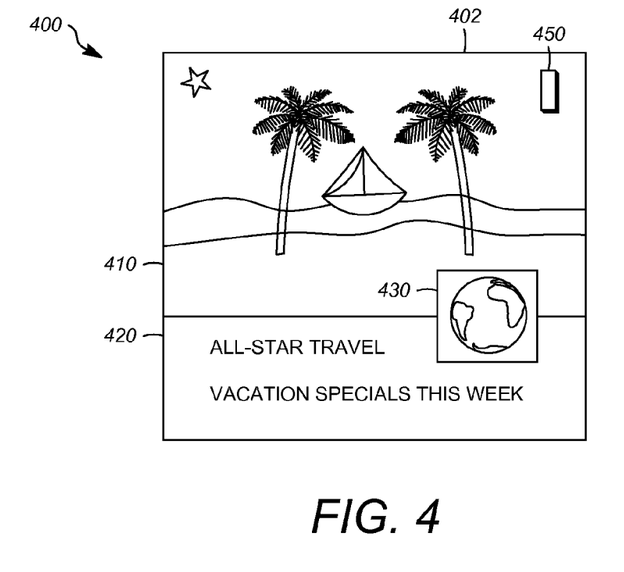
FIG. 4 is an illustration showing a message preview element.

FIG. 4 is an illustration showing a message preview element 400. The message preview element 400 can be utilized in the example described with respect to FIG. 3 in place of the message preview elements 350.

The message preview element 400 includes a first graphical content portion 410 and a textual content portion 420 that are positioned within an outer boundary 402 of the message preview element 400. A graphical content element from a respective e-mail message can be displayed in the first graphical content portion 410 of the message preview element 400. A textual content element from a respective e-mail message can be displayed within the textual content portion 420 of the message preview element 400. By providing both graphical content and textual content that are extracted from an e-mail message within the message preview element 400, an informative and visually pleasing representation of an e-mail message can be displayed within an e-mail message interface such as the e-mail interface screen 300. The message preview element 400 can also include a second graphical content portion 430. The second graphical content portion 430 can include a graphical content element that is extracted from the respective e-mail message or can include a graphical content element that is representative of the sender of the e-mail message, such as a logo, but is retrieved from a source other than the electronic mail message, such as a profile associated with the sender of the e-mail message, as will be explained further herein.

The message preview element 400 also includes an interface element 450. The interface element 450 can provide opportunities for the user to interact with the message preview element 400. In the illustrated example, the interface element 450 is a button that can be activated within the context of the user interface by a click or tap type interface action. In other examples, the interface element could be a non-visible interface element such as an interface element that reacts to certain types of interaction by a human interface device such as a mouse or touch-screen interface. For example, the interface element 450 could respond to a mouse hover over the message preview element 400. As another example, the interface element 450 could be an interface action that responds to a swipe-type gesture performed via a touch-screen interface. In order to provide interaction with the message preview element 400, a number of different functions could be provided for the interface element 450. As examples, activation of the interface element 450 can cause a change in the graphical or textual content displayed within the message preview element 400, can cause display of a menu, can cause display of a dialogue box, or can cause display of additional information that relates to the content of the e-mail or the sender of the e-mail that is represented by the message preview element 400.

Figure 5:
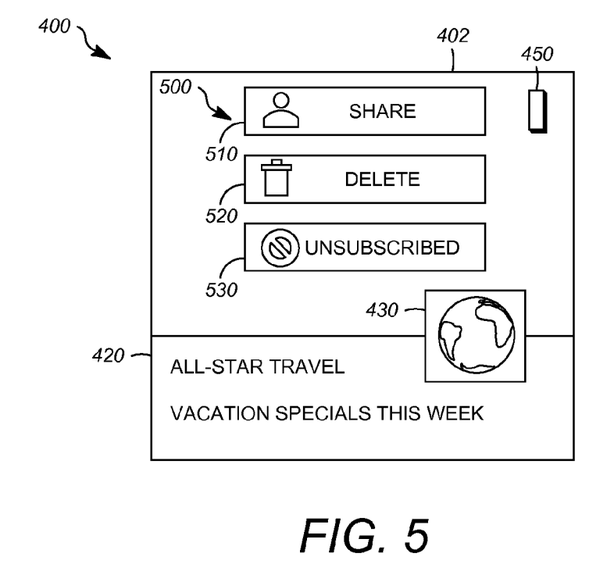
FIG. 5 is an illustration showing a first menu displayed by the message preview element.

FIG. 5 is an illustration showing an example in which a first menu 500 is displayed by the message preview element 400. The first menu 500 is displayed within the confines of the outer boundary 402 of the message preview element 400. In alternative implementations, the first menu 500 could be displayed outside of the outer boundary 402 of the message preview element 400, such as in an area that is directly adjacent to the outer boundary 402 of the message preview element 400. The first menu 500 includes at least one message action button for causing execution of an action with respect to the e-mail message that is represented by the message preview element 400. As examples, the first menu 500 can include message action buttons that allow the user to take actions with respect to the message. In some examples, the actions that can be taken with respect to the message are not dependent upon information contained in the electronic mail message. In the illustrated example, the first menu 500 includes a share button 510 for causing the contents of the e-mail message to be shared via a social networking service or similar service, a delete button 520 for causing deletion of the e-mail message or removal of the e-mail message from the user's primary mailbox, and an unsubscribe button 530 for transmitting an unsubscribe message to the sender of the electronic mail message, thereby allowing the user to easily opt out of commercial electronic mail messages. In other examples, the first menu 500 can include message action buttons that cause execution of actions with respect to the e-mail message represented by the message preview element 400 that are based on information contained in the respective electronic mail message.

Figure 6:
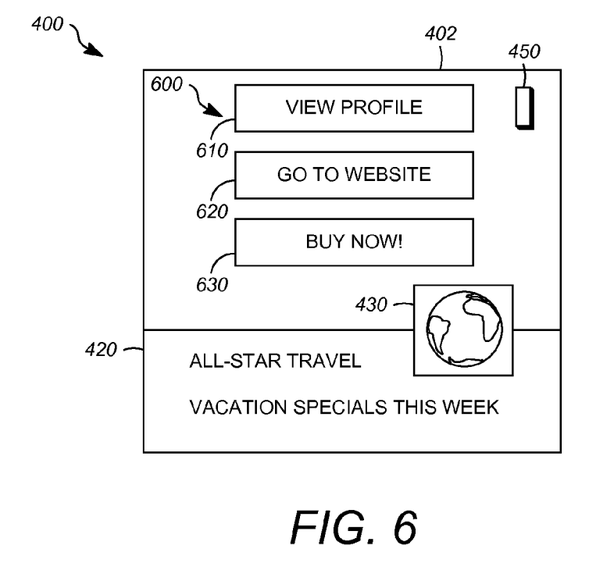
FIG. 6 is an illustration showing a second menu displayed by the message preview element.

FIG. 6 is an illustration showing a second menu 600 displayed by the message preview element 400. The second menu 600 includes message action buttons that execute functions that are based on information from the electronic mail message. Examples of information from the electronic mail message that can be utilized as a basis for determining the functions performed by the message action buttons include the identity of the sender of the electronic mail message and URLs that are contained in the electronic mail message. Other types of message action buttons can be provided within the second menu 600 based on the above-noted types of information or based on other information from the electronic mail message.

The second menu 600 can be displayed, for example, in response to activation of the interface element 450, as previously described. In one implementation, the second menu 600 is displayed in lieu of the first menu 500. In another implementation, the message preview element 400 is operable to display both the first menu 500 and the second menu 600, in response to successive operation of the interface element 450, in response to operation of an additional interface element of the message preview element, or in any other suitable manner. In further implementations, some or all of the buttons contained in the first menu 500 and the second menu 600 can be combined into a single menu.

The second menu 600 includes a view profile button 610 for navigating to a profile containing information relating to the sender of the respective electronic mail message, such as a social networking profile. The second menu 600 can also include a navigation button 620 for navigating to a website which can be, for example, a website described by a URL that is contained within the e-mail message represented by the message preview element 400. The second menu 600 can also include a transaction button 630 for allowing the user to initiate a purchase transaction with respect to goods or services that are described in the electronic mail message that is represented by the message preview element 400. Information for causing commencement of the purchase transaction can be based on information that is contained within the electronic mail message or based on information that is maintained by the operator of the e-mail service 130. Other types of buttons could be provided based on the information contained in the respective electronic mail message. As an example, a button could be provided for initiating a telephone call to a telephone number that is included in the electronic mail message.

Figure 7:
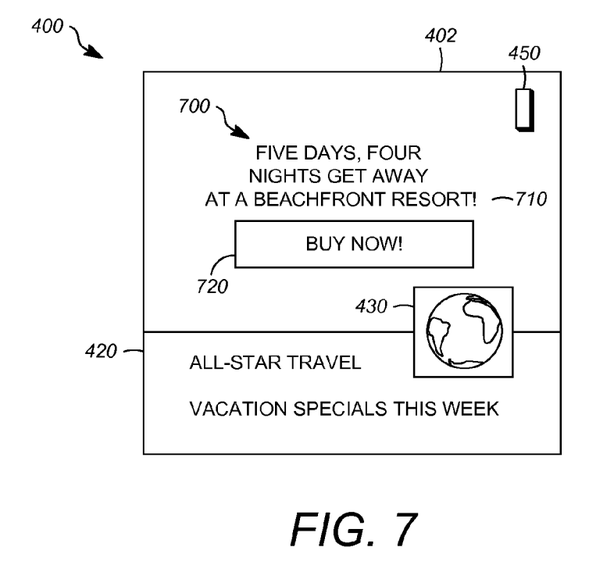
FIG. 7 is an illustration showing a third menu displayed by the message preview element.

FIG. 7 is an illustration showing a third menu 700 that can be displayed by the message preview element 400. The third menu 700 can be displayed, for example, in response to activation of the interface element 450 during display of the message preview element 400, as shown and described with respect to FIG. 4. In the third menu 700, a descriptive portion 710 provides information regarding an action that can be taken by the user, and an action button 720 allows the user to perform the action. In the illustrated example, a descriptive portion 710 describes a purchase transaction that can be commenced by the user upon activation of the action button 720. As previously described, the purchase transaction that is described by the descriptive portion 710 and initiated by the action button 720 can be based on information contained in the electronic mail message represented by the message preview element 400 or can be based on information external to the electronic mail message, such as information maintained by the operator of the e-mail service 130.

Figure 8A:
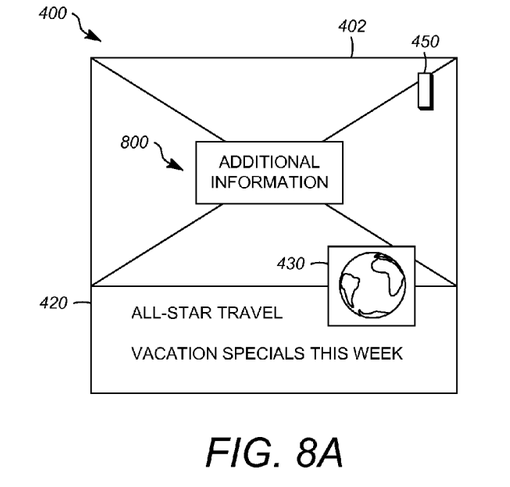
FIG. 8A is an illustration showing additional information displayed by the message preview element.

FIG. 8A is an illustration showing additional information displayed within the context of the message preview element 400 in response to activation of the interface element 450. The additional information 800 can be displayed within the confines of the outer boundary 402 of the message preview element 400. The additional information 800 is information that is related to the sender of the e-mail message represented by the message preview element 400 or information that is related to the substantive content of the e-mail message that is represented by the message preview element 400. As one example, the additional information 800 can be information that is retrieved from a profile that is associated with the sender of the e-mail message based on the identity of the sender of the e-mail message. Examples of this information include contact information for the sender of the electronic mail message, such as an address or telephone number, a map showing a physical location for a place of business of the sender of the electronic mail message and links to internet web pages that contain content that is related to the sender of the electronic mail message or related to the substantive content of the electronic mail message. Other types of information can be provided as the additional information 800, wherein the additional information 800 is external to the electronic mail message that is represented by the message preview element 400 and is identified based upon the information contained in the electronic mail message.

Figure 8B:
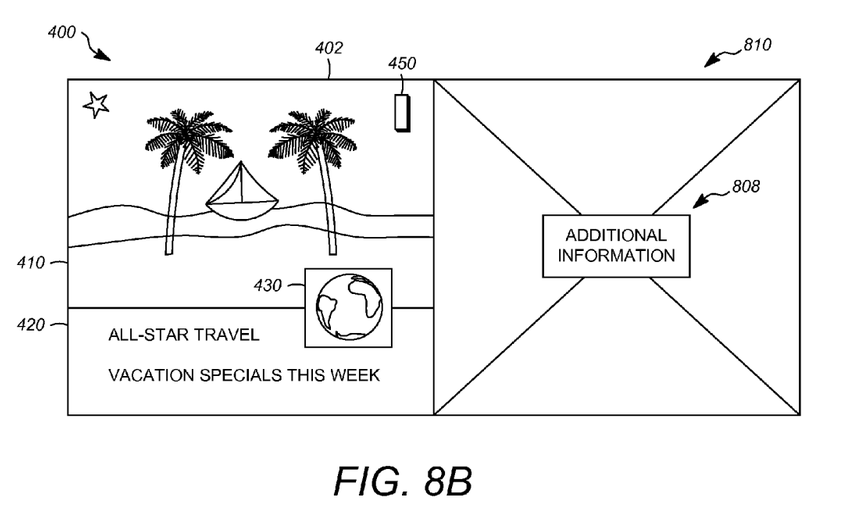
FIG. 8B is an illustration showing an information panel displayed by a message preview element.

FIG. 8B is an illustration showing an information panel 810 that can be displayed by the message preview element 400 in some implementations by operation of the interface element 450. The information panel 810 is displayed adjacent to the outer boundary 402 of the message preview element 400 and can contain the additional information 800 therein where the additional information 800 is as described previously.

Figure 9:
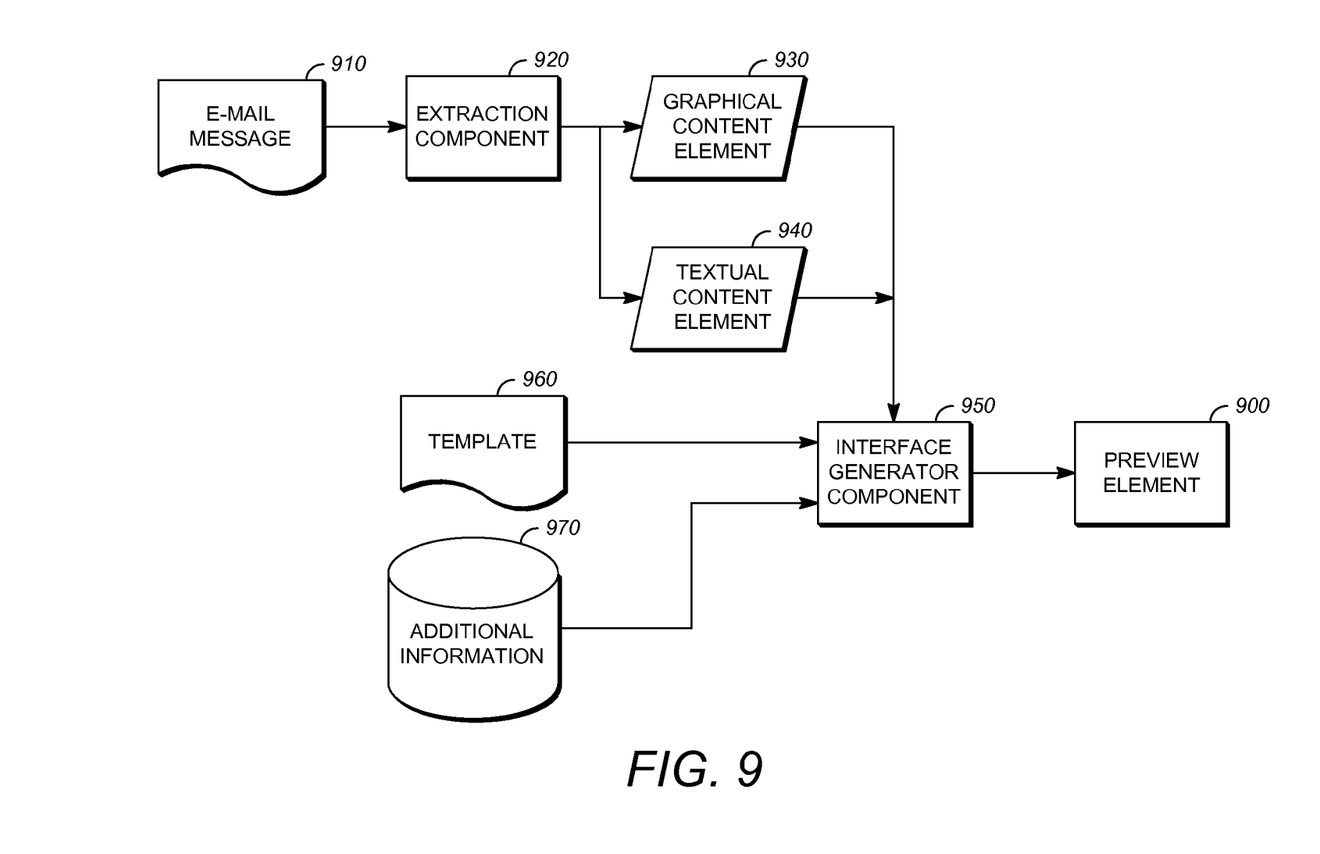
FIG. 9 is a block diagram showing generation of a preview element.

FIG. 9 is a block diagram showing generation of a preview element 900, which can be similar to the message preview element 400 which was previously described. An e-mail message 910 is provided to an extraction component 920. The e-mail message 910 can be, for example, a message that was received at the e-mail service 130 from one of the sender systems 120 by any suitable electronic messaging protocol, such as the SMTP protocol.

The extraction component 920 can be a software component executed by the one or more server computers 140 of the e-mail service 130. The extraction component 920 is operable to extract information from the e-mail message 910. The extraction component 920 can extract a graphical content element 930 and a textual content element 940 from the e-mail message 910.

The graphical content element 930 is selected by the extraction component 920 from among graphical content items that form a part of the message itself, or are referenced in the message, such as by a link to an external image resource in an HTML formatted e-mail message. The graphical content element 930 can be identified and extracted by the extraction component 920 based on a number of factors that suggest that the graphical content element 930 is representative of the subject matter of the e-mail message 910. For example, the signals that can be used by the extraction component 920 to determine which of several graphical elements should be extracted as a graphical content element 930 include the size of the graphical content element 930, the placement of the graphical content element 930 within the e-mail message 910, formatting applying to the graphical content element 930 within the e-mail message 910, and surrounding textual context with respect to the graphical content element 930 in the e-mail message 910. As an example, these signals can be utilized for generating a numerical score for each graphical content element in the e-mail message, and the highest ranked element can be selected. Other information within the e-mail message 910 can be utilized to select the graphical content element 930 for extraction from the e-mail message 910. With respect to some e-mail messages, it may be the case that there are no graphical content elements present in the e-mail message, or it may be the case that none of the graphical content elements that are present in the e-mail message are representative of the subject matter of the e-mail message, for example, based on the numerical ranking described above not meeting a minimum threshold value. In these cases, the extraction component can extract an additional textual element for display in place of the graphical content element 930, in the same manner as will be described with respect to the textual content element 940.

The textual content element 940 can be extracted from the e-mail message 910 based on factors that indicate that the textual content element 940 is representative of the subject matter of the e-mail message 910. In a simple example, the textual content element can be the subject of the e-mail message 910. In other examples, the textual content element 940 can be extracted from the e-mail message 910 using means such as semantic analysis of the text content within the e-mail message 910 to determine which portions of the e-mail message 910 are most important, and those portions can be used as the basis for textual content element 940 by the extraction component 920.

The graphical content element 930 and the textual content element 940 are provided as inputs to an interface generator component 950. The interface generator component 950 can combine the graphical content element 930 and the textual content element 940 to generate the preview element 900.

In one implementation, the interface generator component 950 receives a template 960 as a further input. The template 960 can include a graphical content portion and a textual content portion, wherein the interface generator component 950 generates the preview element 900 such that the graphical content element 930 is presented within the graphical content element portion of the template 960, and the textual content element 940 is presented within the textual content portion of the template 960.

The interface generator component 950 is further operable to include other components within the preview element, as previously described, such as incorporating an interface component for causing actions to be performed as described with respect to the interface element 450 and the further interface components displayed in response to activation of the interface element 450.

The interface generator component 950 can also access additional information 970. As previously described, the additional information 970 can be associated with the sender of the e-mail message 910 or can be related to the subject matter that forms the substance of the e-mail message 910. In one implementation, the additional information 970 is stored at the e-mail service 130, such as in a database, and includes a profile containing information for the sender of the e-mail message 910. In an alternative implementation, the additional information 970 can be retrieved from the worldwide web via a search made by the e-mail service 130 at the time when the interface generator component 950 generates the preview element 900.

Figure 10:
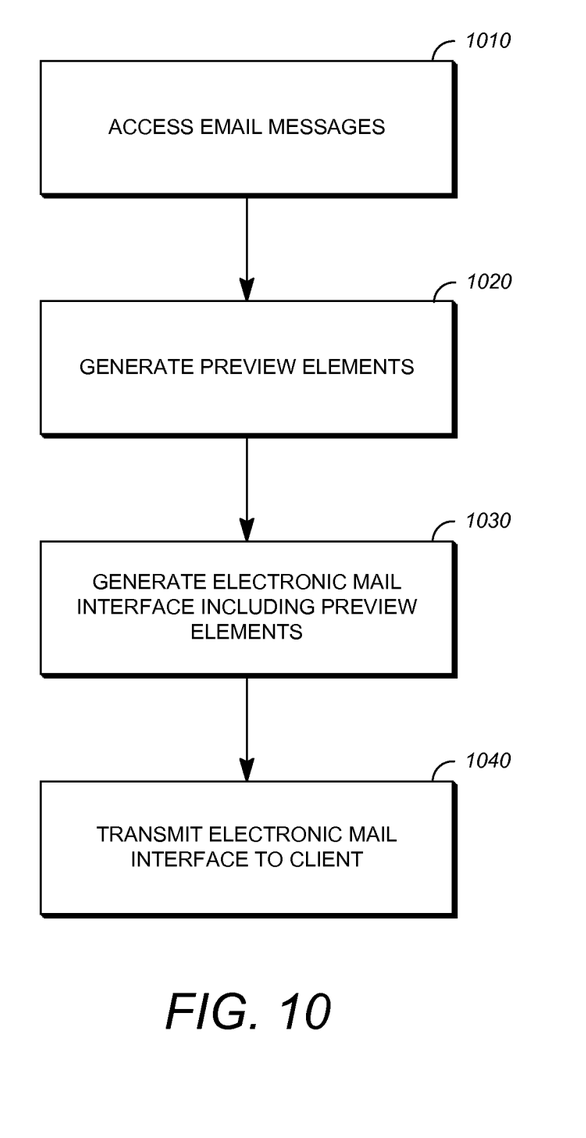
FIG. 10 is a flowchart showing an example of a process for generating e-mail interfaces.

FIG. 10 is a flow chart showing a process 1000 for generating an e-mail message interface.

The operations described in connection with the process 1000 can be performed at one or more computers, such as at the one or more server computers 140 of the e-mail service 130. When an operation is performed by one or more computers, it is completed when it is performed by one computer. The operations described in connection with the process 1000 can be embodied as a non-transitory computer readable storage medium including program instructions executable by one or more processors that, when executed, cause the one or more processors to perform the operations. For example, the operations described in connection with the process 1000 could be stored at the memory 220 of a respective one of the server computers 140 and be executable by the CPU 210 thereof.

In operation 1010, e-mail messages are accessed. For example, a plurality of email messages can be accessed by one or more server computers, such as the one or more server computers 140 of the e-mail service 130. Accessing e-mail messages can be performed, for example, by accessing them from a storage device, either locally or via a network, or accessing them from memory. Accessing e-mail messages can be performed, for example, as described with respect to the e-mail message 910, the extraction component 920, and the interface generator component 950. The e-mail messages that are accessed can be, for example, messages that were received at the electronic mail service 130 from one or more of the sender systems 120, and which specify the operator of the user system 110 as a recipient by an identifier such as an e-mail address.

In operation 1020, preview elements are generated. Generation of preview elements can be performed as described with respect to FIG. 9. This operation can be performed for some or all of the e-mail messages that were accessed ate operation 1010, and will be performed with respect to each e-mail message that will appear in the e-mail message interface generated by the process 1000. The preview elements generated herein are as described, for example, with respect to the message preview element 400 and the preview element 900.

In operation 1030 an e-mail message interface is generated including the preview elements that were generated at operation 1020. The e-mail message interface can be generated, for example, in the form of instructions that, when executed, cause an e-mail message interface to be output for display. In one example, the e-mail message interface is generated as an HTML document including HTML instructions, JavaScript instructions, and/or CSS instructions.

In operation 1040, the e-mail message interface that was generated at operation 1030 is transmitted to a client device. As an example, the e-mail message interface can be transmitted from the one or more server computers 140 of the e-mail service 130 to the user system 110 via the network 150. As previously noted, the e-mail message interface can be transmitted in the form of instructions that, when executed at a client device, cause the e-mail message interface to be output for display at the client device. At the client device, such as the user system 110, the instructions or other information for outputting the e-mail message interface for display are received and interpreted, thereby causing the e-mail message interface to be output for display at the user system 110.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
    identifying, at a server computer, a plurality of electronic mail messages that designate a first user as a recipient;
    receiving, at the server computer, a request for an electronic mail interface for presenting the plurality of electronic mail messages on a client computing device associated with the first user;
    extracting, by the server computer, information from a first one of the electronic mail messages in the plurality of electronic mail messages;
    evaluating one or more actions that can be taken with respect to the first one of the electronic mail messages including determining one or more actions that are unrelated to contents of the first one of the electronic mail messages and one or more actions that relate to content included in the first one of the electronic mail messages;
    constructing a preview element for the first one of the electronic mail messages of the plurality of electronic messages, the preview element including a textual content portion, a graphical content portion and an interface portion, wherein the interface portion includes a first menu for displaying actions that are unrelated to the first one of the electronic mail messages and a second menu for displaying actions that are related to the content of the first one of the electronic mail messages
    outputting, for display at a client computing device associated with the first user, the electronic mail interface including a preview for the first one of the plurality of electronic mail messages wherein the interface portion includes an interface element for causing performance of an action for the first one of the electronic mail messages.

2. The method of claim 1, wherein the action includes initiating a purchase transaction.

3. The method of claim 1, wherein the action includes navigating to a location specified by a URL that is included in the respective electronic mail message.

4. The method of claim 1, wherein the action includes initiating a telephone call using a telephone number that is included in the respective electronic mail message.

5. The method of claim 1, wherein the action includes transmitting an unsubscribe message to a sender of the electronic mail message.

6. The method of claim 1, wherein the action for each electronic mail message includes navigating to a profile containing information related to a sender of the respective electronic mail message.

7. The method of claim 1, wherein the information contained in each electronic mail message includes an identity of a sender of the respective electronic mail message.

8. The method of claim 1, wherein the information contained in each electronic mail message includes a URL.

9. The method of claim 1, further comprising:
    extracting, from the first one of the electronic mail messages, a graphical content element; and
    extracting, from the first one of the electronic mail messages, a textual content element, wherein the message preview element for each electronic mail message incorporates the respective graphical content element and the respective textual content element.

10. A non-transitory computer program product comprising instructions, that when executed, cause one or processors to:
    identify, at a server computer, a plurality of electronic mail messages that designate a first user as a recipient;
    receive, at the server computer, a request for an electronic mail interface for presenting the plurality of electronic mail messages on a client computing device associated with the first user;
    extract, by the server computer, information from a first one of the electronic mail messages in the plurality of electronic mail messages;
    evaluate one or more actions that can be taken with respect to the first one of the electronic mail messages including determining one or more actions that are unrelated to contents of the first one of the electronic mail messages and one or more actions that relate to content included in the first one of the electronic mail messages;

construct a preview element for the first one of the electronic mail messages of the plurality of electronic messages, the preview element including a textual content portion, a graphical content portion and an interface portion, wherein the interface portion includes a first menu for displaying actions that are unrelated to the first one of the electronic mail messages and a second menu for displaying actions that are related to the content of the first one of the electronic mail messages; and output, for display at a client computing device associated with the first user, the electronic mail interface including a preview for the first one of the plurality of electronic mail messages wherein the interface portion includes an interface element for causing performance of an action for the first one of the electronic mail messages.

11. The method of claim 10, wherein the action is selected from the group comprising initiating a purchase transaction, navigating to a location specified by a URL that is included in the first one of the electronic mail messages, initiating a telephone call using a telephone number that is included in the first one of the electronic mail messages, transmitting an unsubscribe message to a sender of the first one of the electronic mail messages, or navigating to a profile containing information related to a sender of the first one of the electronic mail messages.

12. The method of claim 10, wherein the information contained in the first one of the electronic mail messages includes an identity of a sender of the respective electronic mail message.

13. The method of claim 10, wherein the information contained in the first one of the electronic mail messages includes a URL.

14. The method of claim 10, further comprising:
extracting, from the first one of the electronic mail messages, a graphical content element; and
extracting, from the first one of the electronic mail messages, a textual content element, wherein the preview element for each electronic mail message incorporates the respective graphical content element in the graphical content portion and the respective textual content element in the textual content portion.

15. A system comprising:
a processor;
a memory including instructions for execution by the processor to:
identify, at a server computer, a plurality of electronic mail messages that designate a first user as a recipient;
receive, at the server computer, a request for an electronic mail interface for presenting the plurality of electronic mail messages on a client computing device associated with the first user;
extract, by the server computer, information from a first one of the electronic mail messages in the plurality of electronic mail messages;
evaluate one or more actions that can be taken with respect to the first one of the electronic mail messages including determining one or more actions that are unrelated to contents of the first one of the electronic mail messages and one or more actions that relate to content included in the first one of the electronic mail messages;
construct a preview element for the first one of the electronic mail messages of the plurality of electronic messages, the preview element including a textual content element, a graphical content portion and an interface portion, wherein the interface portion includes a first menu for displaying actions that are unrelated to the first one of the electronic mail messages and a second menu for displaying actions that are related to the content of the first one of the electronic mail messages; and
output, for display at a client computing device associated with the first user, the electronic mail interface including a preview for the first one of the plurality of electronic mail messages wherein the interface portion includes an interface element for causing performance of an action for the first one of the electronic mail messages.

* * * * *